United States Patent Office 2,805,345
Patented Sept. 3, 1957

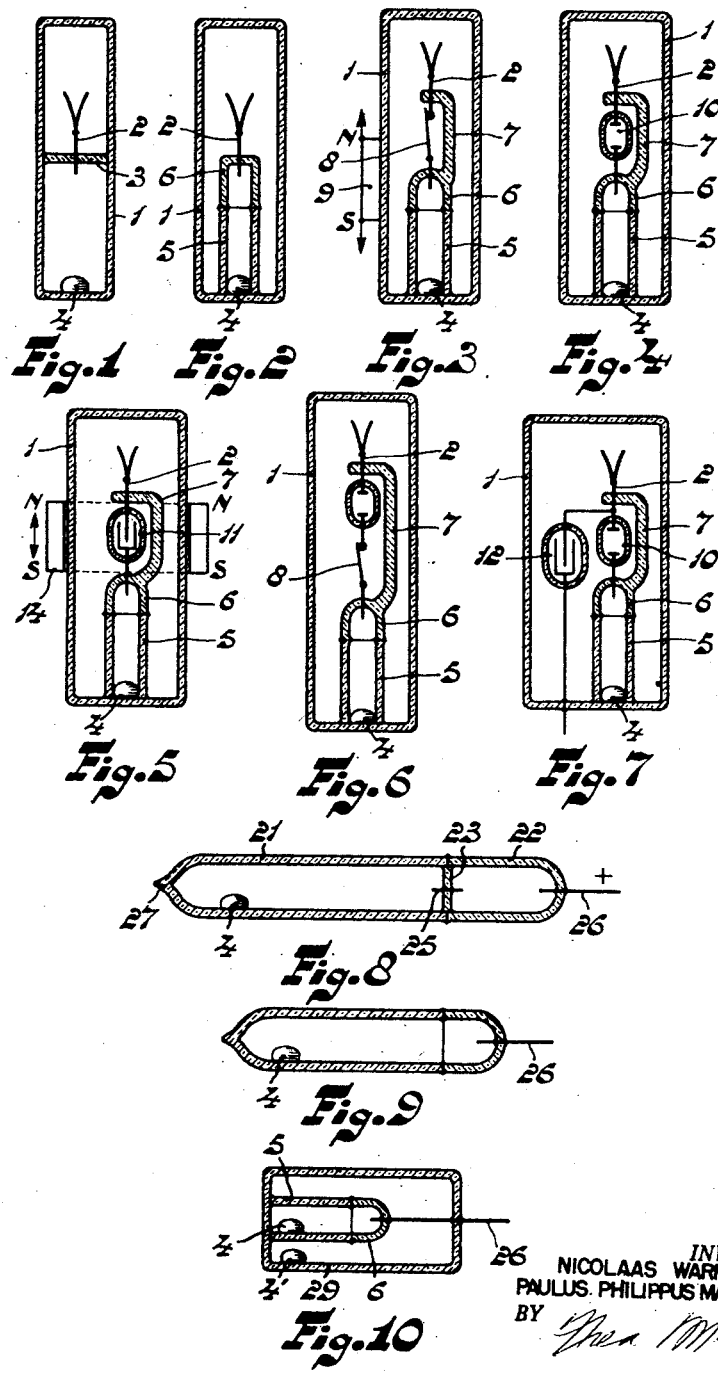

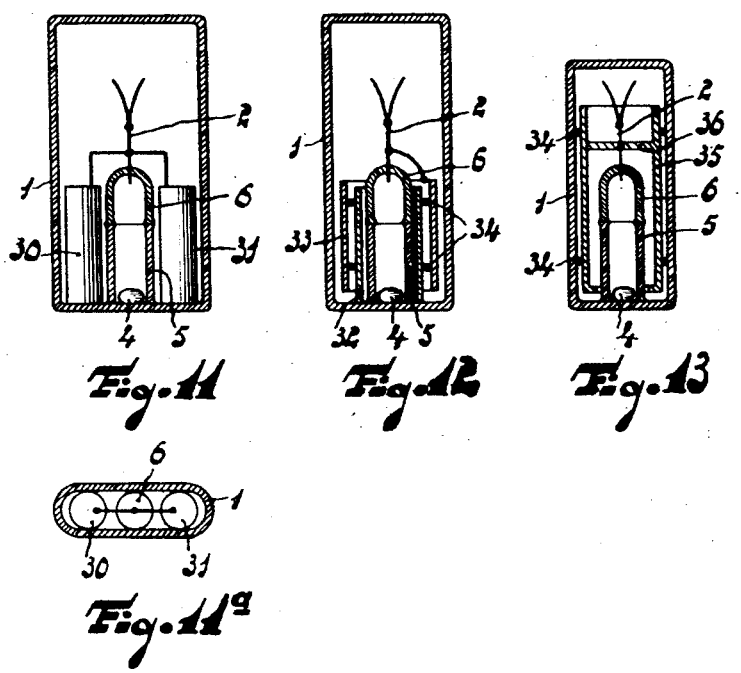

2,805,345

RADIATION DETECTOR

Nicolaas Warmoltz and Paulus Philippus Maria Schampers, Eindhoven, Netherlands, assignors, by mesne assignments, to North American Philips Company, Inc., New York, N. Y., a corporation of Delaware Application February 24, 1953, Serial No. 338,448

Claims priority, application Netherlands March 15, 1952

7 Claims. (Cl. 250—83.3)

This invention relates to radiation detecting devices, more particularly, to devices for indicating and determining the quantity of the intensity of ionising radiation, for example $\alpha$, $\beta$ and $\gamma$-rays, X-rays, neutrons, protons and other particles.

Devices of the foregoing type may comprise an electrostatically-operating, insulated, indicator system consisting of at least one sensitive conductor, which is movable relative to an adjacent conductor, or of two sensitive conductors both movable relative to each other disposed in a gaseous atmosphere. When the indicator system receives an electric charge, the conductors, having identical charges, will repel each other. However, if the gas in the proximity of the indicator is ionised, for example, by incoming radiation, the charge on the conductors will be conducted away and they will approach each other again. At a given instant, therefore, the spacing between the conductors is an indication of the quantity of incident radiation. By measuring the time during which the radiation has been received, the intensity of the radiation can also be determined.

The main object of the invention is to provide a device of the foregoing type having a high sensitivity, which will be able to be carried in a suitcoat pocket, and which will be ready for use at all times and at any location in an extremely simple manner.

According to the invention, a radiation detecting device comprises a charging system including a closed vessel which consists at least partly of insulating material and which contains a quantity of conductive material of such kind so to be able to create a static charge due to friction between the material and the wall of the vessel. The device further comprises an indicating system comprising two relatively movable conductors coupled to the charging system by means of another conductor. Upon shaking the vessel so that the conductive material contacts both the wall of the vessel and also the coupling conductor, a quantity of static electricity is produced and transferred to the indicating system sufficient to impart the required volage thereto to cause the movable conductors to diverge.

The conductive material is preferably mercury, which is contained in the form of a drop in the vessel. Hence, the static charge produced is due to friction between the mercury and the wall of the vessel. Of course, the wall of the vessel must then consist of a material which is not attacked by mercury. This condition is satisfied by most glass species and ceramic materials and, in addition, by many plastics.

The wall of the vessel may consist of glass. In this case it is preferable that part of the wall, and more particularly the part through which the coupling conductor is passed, should consist of glass having good insulating properties, whereas the remaining part of the wall should be made from glass having poor insulating properties. The vessel is also preferably closed in a vacuum-tight manner. On shaking the vessel, the drop of mercury acquires a positive polarity, whereas the wall is charged negatively. A part of the positive charge of the mercury drop is transferred to the indicating system of the device. However, the negative charges should be able to be dissipated in order to permit renewed charging by shaking. If the glass has a composition at which it is slightly electrically conductive enabling slow dissipation of the charges thereon, repeated charging will become possible.

Instead of mercury, other conductive materials may be used. Thus, for example, metal particles e. g. little balls, may be introduced into the vessel. If the metal particles consist of ferromagnetic material, the motion required for charging may alternatively be obtained other than by shaking, for example, by rotation of a magnet situated outside the vessel.

Renewed charging of the indicator system must be prevented while measuring the ionising radiation. Consequently, if iron or steel balls are used as the conductive material, they may, while measuring the ionising radiation, be held magnetically in order to prevent them from engaging the coupling conductor. If the conductive material is mercury, the method for making the charging apparatus inoperative during the reception of radiation will be explained in greater detail hereinafter.

The serviceability of the device as a portable apparatus for determining radio-active radiation is promoted if the indicator is also disposed in a closed chamber, and the vessel of the charging apparatus and the envelope of the indicator are united to form an assembly. This permits excellent insulation, since in this case no conductors need extend outside of the housing. In order to make such a device more resistant to shocks while charging the indicator system, it is preferable that the indicator should consist of one or more movable conductive electric members clamped at least at one end. A structurally very simple device is obtained if the assembly consists of a glass tube divided by a partition into two parts, one of which contains the indicating system, and the other of which contains the conductive material, a coupling conductor passing through the partition and coupling the two enclosures together.

If the coupling serves directly as a support for the indicator, the device is unsuitable for an integrating operation, that is to say, as a dosimeter for determining the total radiation incident during a given time, since there is a risk of charging due to random movements of the conductive material during said time. In order to obviate this limitation and to permit the device to be used in any desired position, the coupling conductor may, in accordance with the invention, be connected to the indicating system through a switch.

The invention will now be described with reference to the accompanying drawing in which:

Figs. 1 and 2 show two forms of embodiments of a radiation detecting device in accordance with the invention;

Fig. 3 shows a radiation detecting integrating device according to the invention;

Figs. 4, 5, 6 and 7 show devices according to the invention employing a voltage breakdown unit;

Figs. 8, 9 and 10 show devices according to the invention utilising another form of breakdown unit;

Figs. 11 and 11a are front and side views, respectively, of another form of embodiment according to the invention;

Figs. 12 and 13 are modifications of the device shown in Figs. 11 and 11a.

Fig. 1 shows a form of detecting device in accordance with the invention comprising a glass tube 1 divided into two parts by a partition 3. The upper compartment contains an indicating system 2 consisting of a coupling conductor extending through the partition 3 and secured to two leaf-shaped strips of conductive material placed adjacent each other and surrounded by a gas-filling. The strips, which are provided with a metal layer, preferably consist of mica and are a few microns thick. The lower compartment contains a drop of mercury 4.

In the uncharged state of the indicating system, the two indicator strips are very close to one another. On shaking the device, static electricity is produced due to friction between the mercury 4 and the wall of the vessel 1 so that the drop of mercury is positively charged and negative charges are produced on the inner wall of the vessel 1. During shaking of the device, the mercury is also brought into contact with the conductor extending through the wall 3 so that the system 2 also obtains a positive charge due to which the leaves of the indicator repel each other.

On measuring the device is inverted so that the drop of mercury remains in contact with the coupling conductor. In the event of ionising radiation, the gas surrounding the indicator is ionised so that the indicator loses its charge, and the conductive strips again approach each other, thus obtaining an indication of the quantity of radiation. The rapidity at which the leaves approach each other is a measure of the intensity of radiation.

The wall 1 preferably consists entirely of glass having poor insulating or slightly conductive properties. This has the advantage that the negative electric charges formed, by shaking, on the inner wall of the inner chamber can readily be dissipated and repeated charging is possible. Moreover, any charges produced by random conditions on the wall of the vessel 1, for example, due to friction with neighbouring objects, are carried off in order to prevent the indicator from being adversely affected. The partition 3 and, if required, a small part of the inner wall 1 of the lower compartment are made from glass having good insulating properties to enable the system 2 to retain its charge for a very long time in the absence of ionising radiation.

The chamber containing the drop of mercury is preferably exhausted in order to prevent undue breakdown and to enable the drop of mercury to attain a high positive voltage of, say, 3000 volts. The final voltage upon shaking is substantially independent of the effort exercised, at least when shaking sufficiently vigorously, since an excessive voltage causes breakdown. As an alternative, the lower chamber may contain a dilute gas, for example, a rare gas, for stabilising the voltage to any desired value. Thus, for example, an argon filling at a pressure of a few tens of centimetres of mercury will produce a voltage of the order of 250 volts.

The indicating chamber may also be exhausted. In this case, the sensitivity is low, which may be desirable if high radiation intensities are to be determined. If the sensitivity is to be increased, a gas-filling may be used whose pressure depends upon the desired sensitivity of the device. A gas-filling has the additional advantage of stronger mechanical damping of the indicator so that it recovers rapidly. As stated above, the device is so held after shaking so that the drop of mercury is in engagement with the conductor passed through wall 3.

Fig. 2 shows a somewhat different embodiment in which a vessel containing the drop of mercury 4 is installed inside the surrounding vessel 1, and sealed thereto. The wall of the vessel containing the drop of mercury comprises two parts 5 and 6, of which the former has poor insulating properties and the latter has good insulating properties. In a manner similar to Fig. 1, the walls may again consist of glass and the gas-fillings may be the same as those used in the example illustrated therein. In this embodiment, also, the indicator device is inverted during use.

The embodiments shown in Figs. 1 and 2 have the disadvantages that renewed charging of the indicator system 2 may take place due to accidental shaking of the device in performing integrating measurements for a given time, which would lead to erroneous results. This disadvantage is obviated by providing, as shown in Fig. 3, a mechanical switch 8 between the coupling conductor extending through the wall of the vessel containing the drop of mercury, and the indicator system 2 proper. The indicator system 2 is supported by an arm 7 consisting of a material, for example boron oxide ($B_2O_3$), having excellent insulating properties and sealed to the part 6 of the wall. On shaking the device the switch 8 engages a contact fitted to the indicator system 2 thereby charging the system. When the intensity of radiation is to be determined, the switch may be open or closed. The device may be held upright, provided the switch is open. If the device is used as a dosimeter (integrator) the switch must consistently be open. In this case, the device may be held in any desired position. The switch, which can consist of magnetic material, may be held open by a magnet 9 which is movable, for example, in a housing surrounding the device. In this manner, the switch can be withdrawn from the influence of the magnetic field if the system 2 is to have imparted thereto an electrostatic charge.

If the device, when used as a dosimeter, is carried in a pocket, closure of the switch may be prevented by using a mechanical switch of such construction that an electrometer must be rotated several times about definite axis for closing the switch, the switch being opened by carrying out these movements in the reverse order. In this instance, a magnet for holding the switch is not necessary. Of course, the risk of the movements required for closing the switch occurring accidentally in the pocket is extremely small.

As one embodiment, the switch may consist of a contact rod which, in order to assume the closed position between the indicator system 2 and the coupling conductor in the wall of the vessel, must slide a few times along a rectangularly bent rod. As an alternative, a mercury labyrinth may be provided, that is to say, a space from which the mercury can be introduced into the vessel proper only after the latter has been moved into a number of particular positions. This space may, for example, have the form of a helix into which the mercury flows again after charging.

In order that the device may be held in any desired position, use may be made of a breakdown tube 10 disposed between the system 2 and the coupling conductor, as shown in Fig. 4. This tube 10 comprises two electrodes connected to said elements, and may be filled with neon or another rare gas, if desired, at a low pressure. This tube 10 has a given operating voltage so that the system 2, after charging by shaking, at least remains on said voltage. The tube may be directly united with the vessel of the charging device so that the arm 7 can be dispensed with. The electrodes are so shaped that the breakdown voltage in the direction from the indicator system 2 to the charging system 5 is high compared with that in the reverse direction.

The embodiment shown in Fig. 4 is likewise unsuitable for integrating because, similarly to the constructions shown in Figs. 1 and 2, there is a risk of a fresh charge being produced by accidental shaking when the system 2 has become substantially discharged by radio-active radiation. This evil is cured in the device shown in Fig. 5, where a breakdown tube 11 is filled with gas at a low pressure. Prior to charging, a magnetic field is generated in the tube, for example, by means of a permanent magnet, thereby highly reducing the breakdown voltage. This field may be produced by an annular magnet 14 movable about the tube. After the system 2 has been charged, the magnet is shifted so that the magnetic field no longer influences the breakdown tube 11. The breakdown voltage of the tube is thus again raised so that the tube cannot break down upon displacement of the drop of mercury 4.

A breakdown tube, more particularly of the form shown in Figs. 4 and 5, may alternatively be used in combination with a mechanical switch. A device of this type is shown in Fig. 6. This construction has the advantage that the capacitative influence, which the switch might exert on the system 2, is substantially eliminated. In this embodiment, moreover, the risk of undue charging of the indicator system, which risk still exists in the embodiment shown in Fig. 4, is smaller than in the constructions shown in Figs. 3 and 4.

In all of the described above, the wall 1 may, in part, consist of metal, preferably a metal adapted to be easily sealed to glass in a vacuum-tight manner. It will sometimes be desirable to cause the radiation to pass exclusively, or almost exclusively, through a window consisting, for example, of mica and provided in the wall.

As stated above, the sensitivity of the device depends upon the nature of the gas-filling of the portion of the tube 1 containing the indicator system. As a rule, the sensitivity of a stable apparatus will increase as the gas-pressure of the same gas is increased. In order to secure a very high sensitivity, use may be made of the device shown in Fig. 7, whose envelope 1 encloses a Geiger-Müller tube 12. One of the electrodes of this tube 12 is connected to the system 2, and the other is extended ot the outside, or is connected to the semi-conductive glass of a surrounding housing. Use is preferably made of a Geiger-Müller tube whose characteristic curve has a long substantially horizontal part, more particularly, a low-pressure halogen counter. Ionisation of the tube 12 involves a comparatively strong discharge phenomenon (Townsend avalanche) so that the system 2 will become discharged in a relatively short time by very weak radiation.

Alternatively, a photo-electric cell may be substituted for the Geiger-Müller tube, thus rendering the device suitable for measuring luminous intensities. This is again effected by determining the time in which the device becomes discharged upon exposure to the photo-cell.

Alternatively, the devices shown in Figs. 1 to 6 may be made suitable for measuring light rays by coating the wall with light-sensitive material. If the indicatory system is positively charged, for example, when using a drop of mercury in the charging device, the charge disappears because the light dislodges electrons from the wall. If the indicator system is negatively charged, it will be necessary to provide that system also with a light-sensitive layer.

In order to reduce the sensitivity of the device, the capacity of the indicator system may be increased, in the well-known manner, by incorporating a capacitor.

Fig. 8 shows a device for producing static charges as may be employed in a radiation device in accordance with the invention. The device consists of a closed tube having a glass wall comprising two parts 21 and 22 sealed together at a partition 23. The part 21 consists of glass having poor insulating properties, whereas part 22, and preferably also the wall 23, consist of glass having good insulating properties. The drop of mercury 4 is contained in the part enclosed by the wall 21. On shaking the tube, the drop is positively charged, the charge being transferred to a conductor 25 sealed into the wall 23. The right-hand part of the tube comprising a wall 22 contains a suitable gas-filling so that the breakdown voltage has a definite value depending upon the desired charging voltage of the measuring device. A coupling conductor 26 is connected to the indicator system, the system being charged by shaking the tube thereby producing a voltage breakdown between the conductors 25 and 26.

Fig. 9 shows a simplified embodiment wherein the charging device consists of a single vessel containing a drop of mercury. Said vessel may be filled with gas for limiting the voltage produced.

In the example shown in Fig. 10, the inner vessel 5, 6, which may structurally correspond to that of the devices shown in Figs. 2 to 7, is contained in an outer vessel whose gas-filling serves to limit the voltage produced. The conductor 26, supplying the charge to an indicator system, is passed through the walls of both vessels. If the drop of mercury 4 is contained in the inner vessel, at least the outer vessel will be gas-filled, and conversely. As an alternative, both vessels may be filled with gas, and, if desired, different gases. In the latter case the wall of the outer vessel must be slightly conductive.

In the various embodiments of the device described above, wherein the switch is not present, the device is preferably held in inverted position so that the drop of mercury is always in contact with the conductor. This is necessary because if after charging the indicator system, the device is placed upright so that the drop falls back, the divergence of the blades of the indicator system will materially decrease. This is due to the presence of negative charges on the inner wall of the vessel, which charges have such a static influence on the indicator system so as to partly neutralise the effect of the positive charge.

In order to mitigate this disadvantage, the device may comprise additional elements of such a nature as to increase the capacity of the indicator system. In this case, the negative charge produced by the drop of mercury when falling back will have little effect due to the greater charge of the indicator system. By increasing the capacity, the sensitivity is likewise diminished, which is often desirable.

Fig. 11 shows a construction for obtaining this effect in which the reference numeral 1 denotes a laterally-flattened glass tube containing the charging vessel 5, 6 consisting of different materials. Fig. 11a is a cross-sectional plan view of the tube. Disposed within the tube 1 at the vessel 5, 6 are provided capacitors 30 and 31 which increase the capacity of the indicator system 2 relatively to earth. Once the system 2 is given a sufficient charge and the drop of mercury falls back, negative charges will have only a very small influence on the system. The sensitivity is also reduced, which is usually advantageous.

In the embodiment shown in Fig. 12, two capacitor electrodes 32 and 33, one of which is conductively connected to the indicator system 2, is arranged concentrically around the vessel 5, 6 and are separated by insulating members 34. The electrode 32 not connected to the system 2 may either be connected to the outside or simply to the wall 1 if the latter consists of a material having poor insulating properties.

Fig. 13 shows a further modification comprising an envelope 1, wherein a metal cylinder 35 is disposed so as to be slightly spaced therefrom. This cylinder 35 is supported by insulating members 34 and is conductively connected through a plate 36 to the indicator system 2. Except for an aperture at the lower end for the passage of the vessel 5, the cylinder is closed so that the space inside the cylinder is substantially fieldless and the ionisation space is limited to a comparatively small space above the cylinder and between the cylinder and the wall 1. The supporting members 34 are made from good insulating material, preferably fused borax. The cylinder increases the capacity of the system 2 and, in addition, diminishes the sensitivity of the assembly.

Devices as shown in Figs. 11, 12 and 13 are also suitable for performing integrating measurements during a certain time, provided provision is made that the charge of the system 2 is not replenished due to random displacements of the device in carrying out the measurements, as described in connection with Fig. 3.

While we have described our invention in connection with specific embodiments and applications, other modifications thereof will be readily apparent to those skilled in this art without departing from the spirit and scope of the invention as defined in the appended claims.

What is claimed is:

1. A radiation detecting device for determining and indicating the quality and intensity of incident radiation, comprising a hermetically closed vessel, an insulating wall member disposed in said vessel and dividing it into two, separate, adjacent, sealed portions, an electrostatically-operating, insulated, indicator system disposed in one of said sealed portions and to which an electrostatic charge may be imparted and retained, a conductor passing through a portion of said wall member and coupling said indicator system to the other of said sealed portions, and a small quantity of movable, conductive material disposed in said other sealed portion and adapted to cooperate therewith to generate on said conductive material an electrostatic charge, which can be imparted to the indicator system via the conductor by moving the conductive material into engagement with said conductor, the portion of said wall through which said conductor passes having good insulating properties enabling charges associated with said conductor to be retained, said other sealed portion having wall portions spaced from said conductor constituted of a material having slightly conductive properties enabling charges generated thereon to be slowly dissipated.

2. A radiation detecting device as set forth in claim 1 wherein said other sealed portion comprises upper and lower portions, said upper portion being of good insulating material and constituting the wall portion through which said conductor passes, said lower portion being of slightly conductive material enabling charges thereon to be slowly dissipated.

3. A radiation detecting device as set forth in claim 2 wherein a gas-filled discharge tube is coupled between the conductor and the indicator system.

4. A radiation detecting device for determining and indicating the quality and intensity of incident radiation, comprising a hermetically closed vessel, an insulating wall member disposed in said vessel and dividing it into two, separate, adjacent, sealed portions, an electrostatically-operating, insulated, indicator system mounted in one of said sealed portions and to which an electrostatic charge may be imparted and retained, said one sealed portion containing an ionizable medium, a conductor passing through a portion of said wall member, switch means coupling said indicator system to said conductor, and a small quantity of movable, conductive material disposed in said other sealed portion and adapted to cooperate therewith to generate on said conductive material an electrostatic charge which can be imparted to the indicator system via the conductor and the switch means by moving the conductive material into engagement with said conductor, the portion of said wall through which said conductor passes having good insulating properties enabling charges associated with said conductor to be retained, said other sealed portion having exposed wall portions spaced from said conductor constituted of a material having slightly conductive properties enabling charges generated thereon to be slowly dissipated.

5. A radiation detecting device as set forth in claim 4 wherein magnetic means are provided outside of the vessel for manually actuating said switch means.

6. A radiation detecting device for determining and indicating the quality and intensity of incident radiation, comprising a first insulated hermetically closed vessel containing an ionizable medium, an electrostatically-operating insulated indicator system disposed in said first vessel and to which a charge may be imparted and retained, said indicator system comprising a pair of relatively movable conductive members clamped at one end, a second hermetically closed insulated vessel secured to said first vessel and forming therewith a unitary device, an electrostatic charging apparatus disposed in said second vessel, said charging apparatus including mercury droplets, and a conductor electrically interconnecting said two vessels and supporting said indicator system within said first vessel, said conductor passing through a wall portion of said second vessel constituted of a material having good insulating properties, said second vessel having other wall portions spaced from said conductor constituted of a material having slightly conductive properties, whereby charges generated thereon may be slowly dissipated.

7. An electrostatic charge generating apparatus adapted for use in a radiation detecting device, comprising a hermetically closed vessel constituted of insulating material, mercury droplets disposed within said vessel, and a conductor extending through a wall of said vessel into the interior thereof, the portion of the wall of said vessel through which the conductor passes having good insulating properties enabling charges associated with said conductor to be retained thereby, other exposed wall portions of said vessel spaced from the conductor being slightly conductive, whereby charges generated thereon by frictional engagement with said mercury droplets may be slowly dissipated.

References Cited in the file of this patent

UNITED STATES PATENTS

| | | |
|---|---|---|
| 1,855,669 | Glasser et al. | Apr. 26, 1932 |
| 2,646,516 | Futterknecht | July 21, 1953 |
| 2,683,222 | Failla et al. | July 6, 1954 |
| 2,731,568 | Failla | Jan. 17, 1956 |